United States Patent [19]

Cortes

[11] Patent Number: 4,830,515
[45] Date of Patent: May 16, 1989

[54] MOUNTING CLIP FOR A THERMOCOUPLE ASSEMBLY

[75] Inventor: Nestor E. Cortes, Wilton, Conn.

[73] Assignee: Omega Engineering, Inc., Stamford, Conn.

[21] Appl. No.: 138,597

[22] Filed: Dec. 28, 1987

[51] Int. Cl.⁴ .................... G01K 1/14; H01L 35/06
[52] U.S. Cl. ........................ 374/208; 136/221; 374/179
[58] Field of Search ............ 374/208, 179; 136/130, 136/221

[56] References Cited

U.S. PATENT DOCUMENTS

| | | |
|---|---|---|
| 3,309,237 | 3/1967 | Kelchner et al. .......... 136/221 |
| 3,468,723 | 9/1969 | Lambert .................... 136/221 |
| 3,516,872 | 6/1970 | Klassen ..................... 136/221 |
| 3,753,787 | 8/1973 | Webb ........................ 136/230 X |
| 4,043,835 | 8/1977 | Hall, Jr. .................... 136/221 |
| 4,444,990 | 4/1984 | Villar ........................ 374/179 X |
| 4,531,047 | 7/1985 | Canfield et al. ........... 219/553 X |

Primary Examiner—Daniel M. Yasich
Attorney, Agent, or Firm—Bruce E. Hosmer

[57] ABSTRACT

The invention presented is an adjustable mounting clip for a thermocouple assembly comprising a deformable element having a helically wound first portion and a second portion which defines a relatively flat segment, substantially perpendicular to the central axis of the helically wound first portion and capable of supporting a thermocouple terminal block in a thermocouple assembly. Also presented is a thermocouple assembly comprising such mounting clip.

4 Claims, 1 Drawing Sheet

MOUNTING CLIP FOR A THERMOCOUPLE ASSEMBLY

DESCRIPTION

Technical Field

The present invention relates to an adjustable mounting clip for a thermocouple assembly. More particularly, this invention relates to a mounting clip capable of supporting a thermocouple terminal block in a thermocouple assembly in an axially adjustable relation to the thermocouple. The invention also relates to a thermocouple assembly comprising such mounting clip.

Thermocouple assemblies for use in the measurement of temperatures in a sealed environment, such as used to contain a gas or noxious liquid, are designed to extend into a thermocouple well which itself extends into the sealed environment. Such thermocouple assemblies are generally comprised of a thermocouple element housed in a thermocouple protection tube, which is the element of the thermocouple assembly which physically extends into the thermocouple well, a thermocouple terminal block, which provides terminals for electrical connection of the thermocouple element to the thermocouple instrumentation in use, and a thermocouple protection head, which protects the thermocouple terminal block and electrical connections thereon from damage.

The thermocouple terminal block is generally disposed around the thermocouple protection tube and is supported by a mounting support which itself is also disposed around the thermocouple protection tube. The thermocouple protection head is secured to the thermocouple terminal block through securing means which usually extend through the mounting support.

Unfortunately, prior art mounting supports used for supporting the thermocouple terminal block generally comprise a solid support member securely attached to the thermocouple protection tube by suitable means, such as a compression fitting, thereby precluding the ability to axially adjust the position of the thermocouple terminal block on the thermocouple protection tube for use of the thermocouple assembly with thermocouple wells of differing lengths.

What is needed, therefore, is a thermocouple mounting clip which functions to support a thermocouple terminal block on a thermocouple protection tube in an axially adjustable manner, and which is also relatively inexpensive to produce.

DISCLOSURE OF INVENTION

The present invention relates to an adjustable mounting clip for a thermocouple assembly comprising a deformable element having a helically wound first portion and a second portion which defines a relatively flat segment capable of supporting a thermocouple terminal block in a thermocouple assembly.

BRIEF DESCRIPTION OF THE DRAWINGS

The present invention will be better understood and its advantages more apparent in view of the following detailed description, especially when read with reference to the appended drawings, wherein.

BEST MODE FOR CARRYING OUT THE INVENTION

Figure 2:
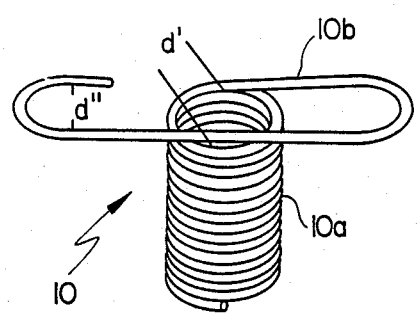
FIG. 2 is a side view in perspective of the mounting clip of the present invention.

Referring to the drawings, an adjustable mounting clip for a thermocouple assembly, in accordance with the invention, is generally indicated by the reference numeral 10. It should be noted that for the sake of clarity all of the components and parts of mounting clip 10 and the thermocouple assembly 100 of which it is a part are not shown and/or marked in all of the drawings. As used in this description, the terms "up", "down", "top", "bottom", etc. refer to mounting clip 10 and thermocouple assembly 100 when in the orientation illustrated in FIG. 3. It will be recognized that mounting clip 10 and thermocouple assembly 100 may assume various orientations when in use, the orientation illustrated in FIG. 3 not being necessary for operability.

Mounting clip 10 generally comprises two portions, as illustrated in FIG. 2: a helically wound first portion 10a and a second portion 10b which defines a relatively flat segment capable of supporting a thermocouple terminal block in a thermocouple assembly.

Figure 1:
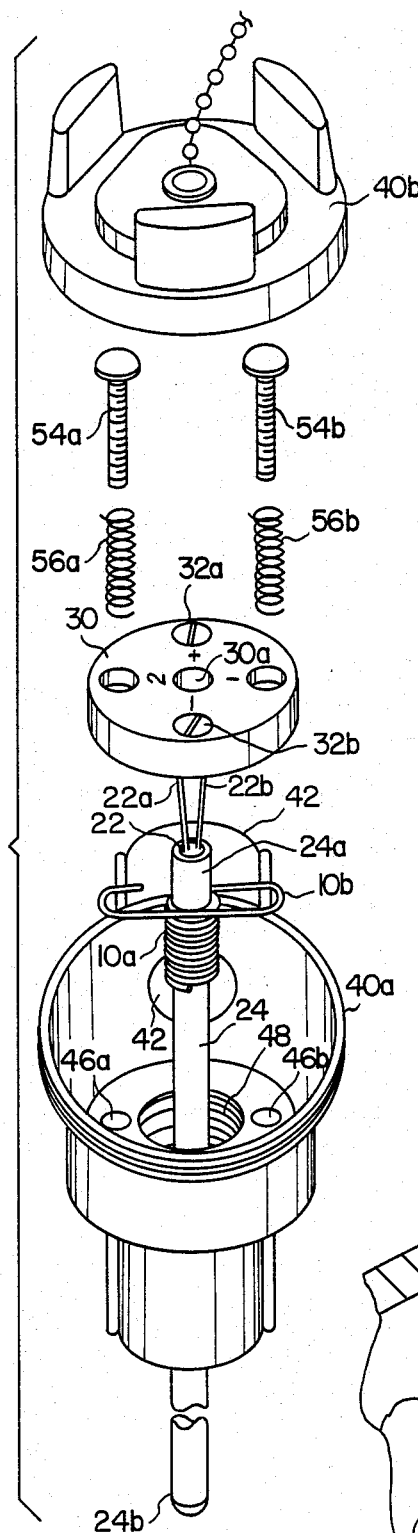
FIG. 1 is an exploded view of the thermocouple assembly of the present invention.
Figure 3:
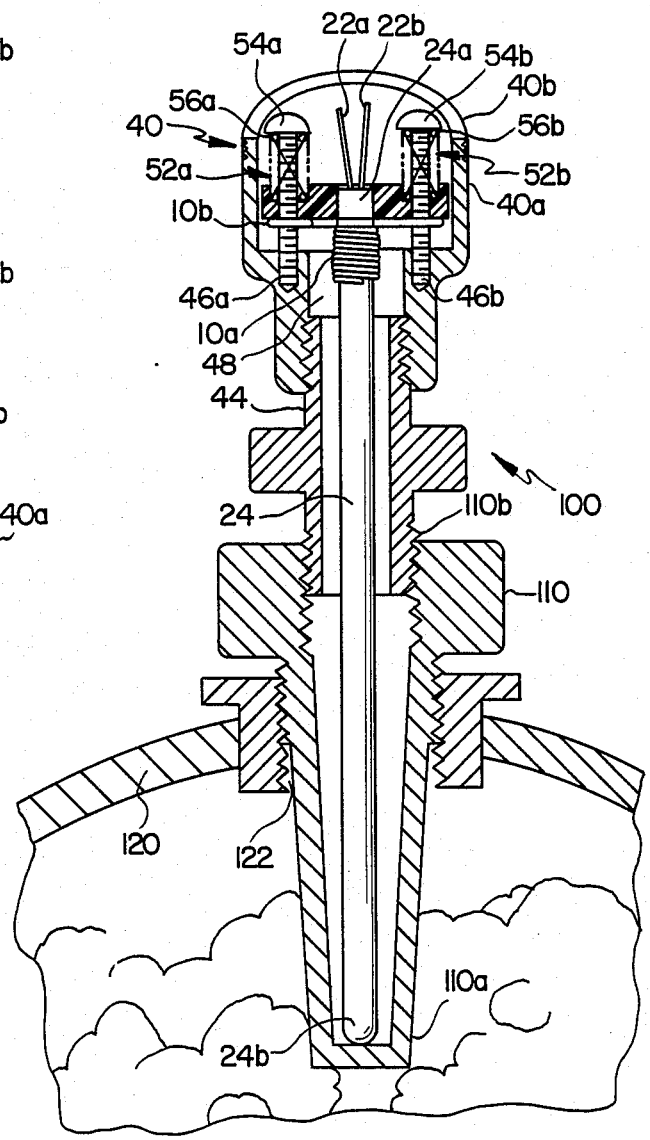
FIG. 3 is a side view in cross-section of the thermocouple assembly of the present invention disposed in a thermocouple well which itself is disposed in a sealed environment.

Advantageously, first portion 10a of mounting clip 10, which functions to dispose mounting clip 10 on a thermocouple protection tube, as discussed in more detail below, is generally a helically wound coil, which is preferably configured as a spring, as illustrated in FIGS. 1–3. It will be readily recognized that, because first portion 10a functions to dispose mounting clip 10 on a thermocouple protection tube, the inner diameter ("d'") of helical first portion 10a should be approximately equal to, and preferably slightly less than, the outer diameter of the thermocouple protection tube on which it is to be disposed. First portion 10a of mounting clip 10, which functions to dispose a thermocouple terminal block on a thermocouple protection tube, is the aspect of mounting clip 10 which provides its axial adjustability, as will be discussed in more detail below.

As illustrated in FIG. 2, second portion 10b of mounting clip 10, which functions to support a thermocouple terminal block, as noted above and discussed in more detail below, is preferably configured to be a looped segment, substantially flat with respect to the upper side of mounting clip 10, and having a diameter ("d''") such that means for securing a thermocouple terminal block which is supported by second portion 10b to a thermocouple protection head to pass through second portion 10b. Advantageously, second portion 10b lies in a plane substantially perpendicular to the central axis of helical first portion 10a.

Adjustable mounting clip 10 of the present invention can be formed of any suitable material which will provide sufficient strength and dimensional stability to permit disposal on a thermocouple protection tube by first portion 10a and support of a thermocouple terminal block by second portion 10b, as discussed in more detail below. Additionally, mounting clip 10 should be formed of a material which is substantially resistant to heat degradation, at least over the range of temperatures at which a thermocouple assembly incorporating mounting clip 10 is expected to operate. Accordingly, mounting clip 10 is advantageously formed of a metal wire, such as steel or iron, which is shaped to form first and second portions 10a and 10b.

Thermocouple assembly 100, as illustrated in FIG. 1, generally comprises, along with mounting clip 10 discussed above, a thermocouple comprising a thermocouple element 22 consisting of thermocouple leads 22a and 22b and a thermocouple protection tube 24 having two ends 24a and 24b. Thermocouple element 22, which typically is sheathed in insulation, as would be familiar to the skilled artisan, is housed within thermocouple protection tube 24 and mounting clip 10 is disposed on thermocouple protection tube 24 by mounting first portion 10a thereon at or near a first or upper end 24a of thermocouple protection tube 24.

Thermocouple leads 22a and 22b are formed of any materials suitable for generating a temperature-dependent electrical signal at a junction therebetween, which signal is able to be translated by suitable instrumentation into a readable indication of temperature at the junction. The junction between thermocouple leads 22a and 22b (not shown) is present within thermocouple protection tube 24 at or near a second end 24b thereof to facilitate temperature measurement in the vessel whose contents are to be measured, as discussed in more detail below. Suitable materials for forming thermocouple leads 22a and 22b are familiar to the skilled practitioner in the field, such as nickel, chromium, platinum, rhodium, copper, aluminum and iron, and alloys and mixtures thereof. The selection of particular materials for use as thermocouple leads 22a and 22b is well within the skill of the art and is dependent in part on the temperature range at which the measurement is intended to be taken. The materials used to form the insulating material about thermocouple leads 22a and 22b can be any suitable electrically insulating material, as would be known.

Thermocouple protection tube 24 functions to prevent damage to thermocouple leads 22a and 22b, such as that caused by handling or exposure to noxious or otherwise harmful materials. Thermocouple protection tube 24 should, therefore, be formed of a material which exhibits the strength, dimensional stability and structural integrity to do so, and yet by thermally conductive to permit the junction between thermocouple leads 22a and 22b to be exposed to the temperature of the material whose temperature is to be measured as accurately and with as little degradation of the temperature as possible. Typically, thermocouple protection tube 24 is formed of a metal, such as steel or iron to provide such protection.

Thermocouple assembly 100 further comprises a thermocouple terminal block 30 comprising a plurality of terminal connections which function to electrically connect thermocouple leads 22a and 22b respectively with the thermocouple instrumentation (not shown) being used to translate the electrical signal from thermocouple leads 22a and 22b into the desired form (i.e., digital or analog temperature readout). As illustrated in FIGS. 1 and 3, thermocouple terminal block 30 is supported by mounting clip 10 which itself is disposed on thermocouple protection tube 24.

Advantageously, thermocouple terminal block 30 has an opening 30a approximately centrally located which permits first end 24a of thermocouple protection tube 24 to pass through opening 30a so that thermocouple terminal block 30 can rest on second portion 10b of mounting clip 10 when second portion 10b of mounting clip 10 is disposed on thermocouple protection tube 24 below first end 24a thereof. This is facilitated by forming opening 30a to have an inner diameter equal to or greater than (preferably slightly greater than) the outer diameter of thermocouple protection tube 24. Moreover, opening 30a permits thermocouple leads 22a and 22b to be available to be connected to the terminal connections respectively, because terminal connections are typically located on an upper side of thermocouple terminal block 30.

Thermocouple terminal block 30 can be formed of any suitable, non-electrically conductive material having the required structural integrity and dimensional stability, as would be familiar to the skilled artisan. Additionally, thermocouple terminal block 30 should preferably be relatively resistant to degradation by heat, at least through the temperature range at which thermocouple assembly 100 is expected to be subjected. Preferred materials include nylon, high density plastics such as high density polyethylene and rubber.

Another element of thermocouple assembly 100 is a thermocouple protection head 40. As illustrated in FIG. 3, thermocouple protection head 40 generally comprises a hollow body which is disposed so as to at least partially enclose thermocouple terminal block 30 to protect thermocouple terminal block 30 from damage due to handling or exposure to noxious or otherwise harmful materials.

Advantageously, thermocouple protection head 40 is formed of a material which has the required strength and stability to protect thermocouple terminal block 30 as described above, such as a metal like steel or iron.

Thermocouple protection head 40 is typically formed as a two-member unit, as illustrated in FIG. 1. The main body 40a of thermocouple protection head 40 functions to provide the protection to thermocouple terminal block 30 from damage from the bottom and sides whereas the cover 40b of thermocouple protection head 40 functions to protect thermocouple terminal block 30 from damage from above. Additionally, cover 40b is advantageously removable to permit access to thermocouple terminal block 30. Thermocouple protection head 40 further has a port 42 which permits leads (not shown) to be run from the terminal connections, respectively, to the instrumentation (not shown) being used to measure the signal from thermocouple 20.

Thermocouple protection head 40 is not directly secured to thermocouple protection tube 24, but instead, thermocouple protection tube 24 is permitted to slide axially through the opening 48 in thermocouple protection head 40 through which thermocouple protection tube extends. Thermocouple protection head 40, though, is indirectly and flexibly secured to thermocouple protection tube 24 through being secured to thermocouple terminal block 30 which is supported on mounting clip 10, which is disposed on thermocouple protection tube 24. Advantageously, thermocouple protection head further comprises extender 44, which is disposed in opening 48 in thermocouple protection head 40. Extender 44 is secured to thermocouple protection head 40 by conventional means, such as by corresponding threads on the inner diameter of opening 48 in thermocouple protection head 40 and on the outer diameter of extender 44, as illustrated in FIG. 3. Extender 44 functions to extend thermocouple protection head 40, as illustrated in FIG. 3 and provides means to mount thermocouple protection head 40 to a thermocouple well.

Thermocouple assembly 100 of the present invention further comprises means for securing thermocouple protection head 40 to thermocouple terminal block 30. Suitable securing means typically comprises two elements, 52a and 52b, as illustrated in FIG. 3. Advantageously, each of securing elements 52a and 52b comprise screws 54a and 54b, respectively, and screw springs 56a and 56b, respectively, as illustrated in FIG. 1. Screw springs 56a and 56b and screws 54a and 54b provide flexibility to tee securing means, thereby substantially reducing the potential for damage to thermocouple assembly 100 upon striking the lower end of a thermocouple well into which thermocouple assembly 100 is disposed, and also assuring that thermocouple protection tube 24 is "bottomed-out" in the thermocouple well, as discussed below.

In a preferred embodiment of the present invention illustrated in FIGS. 1 and 3, screws 54a and 54b are disposed in an axially slidable manner (i.e., without secure connection such as threads) through thermocouple terminal block 30, and preferably also through mounting clip 10, and is threaded into threaded openings 46a and 46b, respectively, in thermocouple protection head 40, thereby securing thermocouple terminal block 30 to thermocouple protection head 40. The heads of screws 54a and 54b respectively, are the agency which secures thermocouple terminal block 30 by the securing means by being larger than the openings in thermocouple terminal block 30 through which screws 54a and 54b are disposed. Screw springs 56a and 56b are disposed about screws 54a and 54b, respectively, between thermocouple terminal block 30 and the heads of screws 54a and 54b, as illustrated in FIG. 1.

In use, thermocouple assembly 100 is disposed in a thermocouple well 110, which itself extends into a vessel 120 which contains the material (such as a gas or noxious liquid) whose temperature is to be measured by thermocouple assembly 100, as illustrated in FIG. 3. Thermocouple well 110 generally comprises a substantially cylindrical element whose lower end 110a is closed and whose upper end 110b is open to permit introduction of thermocouple protection tube 24. Thermocouple well 110 can be made of any material resistant to degradation by the material contained in vessel 120 and is preferably a metal such as steel or iron.

As illustrated in FIG. 3, thermocouple well 110 advantageously extends into vessel 120 through vessel port 122 and is preferably secured in position through means such as corresponding threads disposed on the inner diameter of vessel port 122 and the outer diameter of thermocouple well 110. The appropriate position for thermocouple well 110 extending into vessel 120 is such that lower end 110a of thermocouple well 110 contacts the material whose temperature is to be measured.

Thermocouple assembly 100 is disposed in thermocouple well 110 by extending lower end 24b of thermocouple protection tube 24 into thermocouple well 110, illustrated in FIG. 3. Thermocouple assembly 100 is preferably held in position in thermocouple well 110 by means such as corresponding threads on the inner diameter of thermocouple well 122 and on thermocouple protection head 40 or, most preferably, extender 44, such as illustrated in FIG. 3.

To assure the greatest possible accuracy in the temperature reading of thermocouple assembly 100, effort should be made to cause lower end 24b of thermocouple protection tube 24 to "bottom-out" on, or strike or contact, lower end 110a of thermocouple well 110 thus assuring good contact when thermocouple assembly 100 is positioned in thermocouple well 110 but at the same time prevent crushing damage to lower end 24b of thermocouple protection tube 24. If thermocouple assembly 100 did not comprise the flexible securing means described above, bottoming-out could adversely affect the temperature reading obtained by thermocouple assembly 100 by damaging thermocouple assembly 100.

Consequently, because of unavoidable variations in the length of extender 44, thermocouple well 110, vessel port 122 and thermocouple protection tube 24, which are supposed to be of a certain length, which, although seemingly insignificant, are significant in terms of the desire to dispose lower end 24b of thermocouple protection tube 24 so as to bottom-out on lower end 110a of thermocouple well 110 without sufficient force to damage thermocouple protection tube 24, bottoming-out of thermocouple protection tube 24 on lower end 110a of thermocouple well 110 will occur at times with such potentially damaging force. The flexibility of the disclosed securing means substantially absorbs such potentially damaging force.

When securing means 52 comprises screws 54a and 54b and screw springs 56a and 56b, damage to thermocouple assembly 100 from bottoming-out on lower end 110a of thermocouple well 110 can be substantially avoided. This is because when lower end 24b of thermocouple protection tube 24 bottoms-out on lower end 110a of thermocouple well 110, the resulting pressure on thermocouple protection tube 24 forces thermocouple protection tube 24 upwards and is absorbed by screw springs 56a and 56b, instead of thermocouple protection tube 24 or thermocouple terminal block 30, thus avoiding damage to thermocouple assembly 100.

As noted above, mounting clip 10 is adjustable on thermocouple protection tube 24. This adjustability is provide by first portion 10a of mounting clip 10 by rotating it on thermocouple protection tube 24 in a direction opposite to that which the helically wound coil which forms first portion 10a is wound. This functions to cause first portion 10a to partially unwind due to the frictional drag of the helically wound coil on thermocouple protection tube 24. This unwinding causes the inside diameter "d'" of first portion 10a to increase, thus releasing its grip on thermocouple protection tube 24 and thereby permitting mounting clip 10 to be raised or lowered on thermocouple protection tube 24.

Raising or lowering mounting clip 10 serves to raise or lower thermocouple terminal block 30 which is supported by mounting clip 10. Adjustment of mounting clip 10 (and thereby thermocouple terminal block 30) provides advantageous flexibility to thermocouple assembly 100. Such adjustability permits the use of thermocouple assembly 100 with thermocouple wells, extenders and vessel ports of varying lengths, because the position of terminal block 30 on thermocouple protection tube 24 can be altered, facilitating the lengthening or shortening of the portion of thermocouple protection tube 24 which extends from thermocouple protection head 40 into thermocouple well 110. In this way, it is no longer necessary to produce thermocouple assemblies for each length of thermocouple well used. One thermocouple assembly 100 can be adjusted and used with a plurality of thermocouple wells.

The above description is for the purpose of teaching the person of ordinary skill in the art how to practice the present invention, and it is not intended to detail all of those modifications and variations of it which will become apparent to the skilled worker upon reading the description. It is intended, however, that all such modifications and variations be included within the scope of the present invention which is defined by the following claims.

I claim:

1. A thermocouple assembly comprising
   (i) a thermocouple comprising a thermocouple element and a thermocouple protection tube having two ends, wherein said thermocouple element is housed within said thermocouple protection tube;
   (ii) a mounting clip shaped to facilitate securement of a thermocouple protection tube to a thermocouple terminal block by a securing means, said mounting clip comprising a deformable metallic element having a helically wound first portion comprising a coil of metal wire and a second portion which defines a relatively flat segment substantially perpendicular to the central axis of said helically wound first portion, wherein said helically wound first portion is positioned on said thermocouple protection tube at or near a first end thereof;
   (iii) a thermocouple terminal block comprising terminal connections, wherein said thermocouple terminal block is positioned on and supported by said second portion of said mounting clip;
   (iv) a thermocouple protection head comprising a hollow body which is positioned so as to at least partially enclose said thermocouple terminal block when said thermocouple terminal block is disposed on said said second portion of said mounting clip; and
   (v) said securing means for securing said thermocouple protection head to said thermocouple terminal block,
   wherein said second portion of said mounting clip comprises first and second end segments, each of which consists essentially of a loop of wire of sufficient diameter to enable said securing means for securing the thermocouple terminal block to the thermocouple protection head to pass through said loop; and further wherein said helically wound first portion of said mounting clip is positioned on said thermocouple so as to cause the axial position of said mounting clip on said thermocouple protection tube to be adjustable by rotation of said mounting clip on said thermocouple protection tube.

2. A thermocouple assembly comprising
   (i) a thermocouple comprising a thermocouple element and a thermocouple protection tube having two ends, wherein said thermocouple element is housed within said thermocouple protection tube;
   (ii) a mounting clip comprising a deformable element having a helically wound first portion provided on said thermocouple protection tube and a second portion which defines a relatively flat segment substantially perpendicular to the central axis of said helically wound first portion, said second portion comprising first and second end segments, each of which consists essentially of a loop of wire of sufficient diameter to enable a securing means for securing the thermocouple terminal block to the thermocouple protection head to pass through said loop, wherein said helically would first portion is positioned on said thermocouple protection tube at or near a first end thereof;
   (iii) a thermocouple terminal block comprising terminal connections, wherein said thermocouple terminal block is positioned on and supported by said second portion of said mounting clip;
   (iv) a thermocouple protection head comprising a hollow body which is positioned so as to at least partially enclose said thermocouple terminal block when said thermocouple terminal block is positioned on said said second portion of said mounting clip; and
   (v) said securing means for securing said thermocouple protection head to said thermocouple terminal block.

3. A thermocouple assembly comprising
   (i) a thermocouple comprising a thermocouple element and a thermocouple protection tube having two ends, wherein said thermocouple element is housed within said thermocouple protection tube;
   (ii) a mounting clip comprising a deformable element having a helically wound first portion which is disposed on said thermocouple protection tube so as to cause an axial position of said mounting clip on said thermocouple protection tube to be adjustable and a second portion which defines a relatively flat segment substantially perpendicular to the central axis of said helically wound first portion, wherein said helically wound first portion is positioned on said thermocouple protection tube at or near a first end thereof;
   (iii) a thermocouple terminal block comprising terminal connections, wherein said thermocouple terminal block is positioned on and supported by said second portion of said mounting clip;
   (iv) a thermocouple protection head comprising a hollow body which is positioned so as to at least partially enclose said thermocouple terminal block when said thermocouple terminal block is positioned on said second portion of said mounting clip; and
   (v) a securing means for securing said thermocouple protection head to said thermocouple terminal block.

4. The thermocouple assembly of claim 3 wherein said helically wound first portion of said mounting clip is disposed on said thermocouple so as to cause the axial position of said mounting clip on said thermocouple protection tube to be adjustable by rotation of said mounting clip on said thermocouple protection tube.

* * * * *